US010812246B2

United States Patent
Qin

(10) Patent No.: US 10,812,246 B2
(45) Date of Patent: Oct. 20, 2020

(54) METHOD, BASE STATION AND USER EQUIPMENT FOR RADIO COMMUNICATION IN RADIO COMMUNICATION SYSTEM

(71) Applicant: Sony Corporation, Tokyo (JP)

(72) Inventor: Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/439,717

(22) Filed: Jun. 13, 2019

(65) Prior Publication Data

US 2019/0296880 A1  Sep. 26, 2019

Related U.S. Application Data

(63) Continuation of application No. 15/109,552, filed as application No. PCT/CN2015/071628 on Jan. 27, 2015, now Pat. No. 10,367,628.

(30) Foreign Application Priority Data

Jan. 28, 2014 (CN) .......................... 2014 1 0042432

(51) Int. Cl.
*H04L 5/00* (2006.01)
*H04L 5/14* (2006.01)
(Continued)

(52) U.S. Cl.
CPC .......... *H04L 5/0058* (2013.01); *H04L 1/1812* (2013.01); *H04L 5/001* (2013.01);
(Continued)

(58) Field of Classification Search
CPC ........... H04L 2012/5608; H04L 5/0058; H04L 5/001; H04L 5/1469; H04L 5/0055;
(Continued)

(56) References Cited

U.S. PATENT DOCUMENTS 8,520,491 B2  8/2013 Lunttila et al.
9,185,564 B2  11/2015 Yin et al.
(Continued)

FOREIGN PATENT DOCUMENTS

CN  102461045 A  5/2012
CN  102550109 A  7/2012
(Continued)

OTHER PUBLICATIONS

International Search Report dated Apr. 16, 2015 in PCT/CN2015/071628, filed Jan. 27, 2015.
(Continued)

*Primary Examiner* — Brenda H Pham
(74) *Attorney, Agent, or Firm* — Xsensus, LLP

(57) ABSTRACT

A method, base station, and user equipment (UE) for radio communication in a radio communication system including a base station and a UE, the UE communicating with the base station in carrier aggregation mode over plural component carriers. The method includes: the base station assigns a priority to each component carrier according to at least one of the following rules to enable the UE to select, on overlapped uplink subframes, the component carrier having highest priority for uplink signal transmission, the rules including: desired power loss of uplink signal transmission over the component carrier, burden of uplink signal transmission over the component carrier, number of uplink subframes of the component carrier, and primary/secondary attributes of the component carrier for transmission of a downlink signal corresponding to the uplink signal transmitted over the component carrier. The method, base station, and UE can flexibly adjust the transmission carrier of a PUCCH.

11 Claims, 6 Drawing Sheets

(51) Int. Cl.
*H04W 72/02* (2009.01)
*H04L 1/18* (2006.01)
*H04W 72/10* (2009.01)

(52) U.S. Cl.
CPC .......... *H04L 5/0055* (2013.01); *H04L 5/1469* (2013.01); *H04W 72/02* (2013.01); *H04L 5/005* (2013.01); *H04L 5/0092* (2013.01); *H04W 72/10* (2013.01); *Y02D 70/00* (2018.01); *Y02D 70/1262* (2018.01)

(58) Field of Classification Search
CPC .... H04L 1/1812; H04L 5/0092; H04W 84/12; H04W 80/04; H04W 84/18; H04W 88/06; H04W 74/08; H04W 76/02; H04W 72/04; H04W 74/0816; H04W 74/04; H04W 72/0406; H04W 88/08; H04W 76/00; H04W 84/08; H04W 72/02; H04W 72/10; H04B 7/2123; H04B 7/212
USPC ............. 370/310.2, 328, 338, 329, 341, 348
See application file for complete search history.

(56) References Cited

U.S. PATENT DOCUMENTS

| | | | |
|---|---|---|---|
| 9,615,267 B2 | 4/2017 | Fu et al. | |
| 9,749,875 B2* | 8/2017 | Uchino | H04W 16/32 |
| 2011/0070907 A1* | 3/2011 | Chou | H04B 7/022 |
| | | | 455/507 |
| 2011/0143675 A1* | 6/2011 | Damnjanovic | H04L 5/001 |
| | | | 455/67.11 |
| 2011/0312316 A1* | 12/2011 | Baldemair | H04L 5/001 |
| | | | 455/422.1 |
| 2012/0113827 A1 | 5/2012 | Yamada et al. | |
| 2012/0147844 A1 | 6/2012 | Kim et al. | |
| 2012/0170526 A1* | 7/2012 | Wei | H04L 5/001 |
| | | | 370/329 |
| 2012/0214541 A1 | 8/2012 | Narasimha et al. | |
| 2012/0218904 A1 | 8/2012 | Narasimha et al. | |
| 2012/0223827 A1 | 9/2012 | Fazzalari et al. | |
| 2012/0281548 A1 | 11/2012 | Lin et al. | |
| 2012/0300720 A1 | 11/2012 | Gou et al. | |
| 2013/0114472 A1 | 5/2013 | Tamaki et al. | |
| 2013/0116011 A1* | 5/2013 | Lee | H04W 16/28 |
| | | | 455/562.1 |
| 2013/0182674 A1 | 7/2013 | Lunttila et al. | |
| 2013/0250881 A1* | 9/2013 | Liao | H04L 5/0035 |
| | | | 370/329 |
| 2013/0308484 A1 | 11/2013 | Lunttila et al. | |
| 2013/0322372 A1 | 12/2013 | Kim et al. | |
| 2014/0010128 A1 | 1/2014 | He et al. | |
| 2014/0016594 A1 | 1/2014 | Han et al. | |
| 2014/0029484 A1* | 1/2014 | Choi | H04J 3/1694 |
| | | | 370/280 |
| 2014/0044092 A1 | 2/2014 | Guan et al. | |
| 2014/0192738 A1* | 7/2014 | Nam | H04L 5/001 |
| | | | 370/329 |
| 2014/0192775 A1* | 7/2014 | Li | H04W 74/006 |
| | | | 370/331 |
| 2014/0369324 A1 | 12/2014 | Lin et al. | |
| 2015/0092693 A1 | 4/2015 | Fu et al. | |
| 2015/0208402 A1 | 7/2015 | Hwang et al. | |
| 2016/0029265 A1* | 1/2016 | Li | H04W 36/0061 |
| | | | 455/436 |
| 2016/0205685 A1* | 7/2016 | Wang | H04L 5/001 |
| | | | 370/229 |

FOREIGN PATENT DOCUMENTS

| | | |
|---|---|---|
| CN | 102638896 A | 8/2012 |
| CN | 102752085 A | 10/2012 |
| CN | 102870450 A | 1/2013 |
| CN | 102907036 A | 1/2013 |
| CN | 103155506 A | 6/2013 |
| CN | 103220070 A | 7/2013 |
| CN | 103503360 A | 1/2014 |
| WO | 2013/133302 A1 | 9/2013 |

OTHER PUBLICATIONS

Office Action issued in Chinese Application 201410042432.9 dated Feb. 2, 2019.

* cited by examiner

| TDD UL/DL configuration | 0 | 1 | 2 | 3 | 4 | 5 | 6 | 7 | 8 | 9 |
|---|---|---|---|---|---|---|---|---|---|---|
| 0 | 4 | 6 | 6 | - | 4 | - | 4 | 6 | - | 4 |
| 1 | 7 | 6 | 7, 6 | 4 | | | 7 | 7, 6 | 4 | |
| 2 | 7 | 6 | 8, 7, 4, 6 | 4 | 8 | 7 | 6 | 8, 7, 4, 6 | 4 | 8 |
| 3 | 4 | 11 | 7, 6, 11 | 6, 5 | 5, 4 | 7 | 6 | 6 | 5 | 4 |
| 4 | 12 | 11 | 12, 8, 7, 11 | 6, 5, 4, 7 | 8 | 7 | 7 | 6 | 5 | 4 |
| 5 | 12 | 11 | 13, 12, 9, 8, 7, 5, 4, 11, 6 | 8 | 8 | 7 | 6 | 5 | 4 | 8 |
| 6 | 7 | 7 | 7 | 7 | 5 | 7 | 7 | 7 | 7 | 5 | scheduled subframe number $n$

Figure 4

Table 1

| TDD UL/DL configuration | 0 | 1 | 2 | 3 | 4 | 5 | 6 | 7 | 8 | 9 |
|---|---|---|---|---|---|---|---|---|---|---|
| 3 | 4 | 7(11) | 7, 6 (7, 6, 11) | 6, 5 | 5, 4 | 7 | 6 | 6 | 3 | 5 |
| 6_A | 4(7) | 7 | 7,6 (7) | -(7) | 5,4(5) | 7 | 6(7) | 7 | 7 | 3 |
| 6_B | 4(7) | 7 | 7 | -(7) | 5,4(5) | 7 | 7 | 7 | 7 | 3 |

Table 2

| TDD UL/DL configuration | 0 | 1 | 2 | 3 | 4 | 5 | 6 | 7 | 8 | 9 |
|---|---|---|---|---|---|---|---|---|---|---|
| 1 | 6 | 6 | 7, 6 | 4 | | | 6 | 6 (7, 6) | 4 | |
| 3_A | 5 | 6(11) | 7, 6 (7, 6, 11) | 6, 5 | 5, 4 | | | 6 | 5 | |
| 3_B | 4 | 6(11) | 7, 6 (7, 6, 11) | 6, 5, 4 (6, 5) | 4 (5, 4) | | | 6 | 5 | 4(5) |
| 4_A | 4(12) | 6(11) | 7,6 (12, 8, 7, 11) | 6,5,4 (6, 5, 4, 7) | 4(8) | 7 | 7 | 6 | 5 | 4 |
| 4_B | 4(12) | 6(11) | 7 (12, 8, 7, 11) | 6, 5, 4, 7 | 4(8) | 7 | 7 | 6 | 5 | 4 |
| 4_C | 4(12) | 6(11) | 7,4 (12, 8, 7, 11) | 7,6,4 (6, 5, 4, 7) | 4(8) | 7 | 7 | 6 | 4(5) | 4 |
| 4_D | 4(12) | 6(11) | 7,6, 4 (12, 8, 7, 11) | 6,4 (6, 5, 4, 7) | 4(8) | 7 | 7 | 6 | 4(5) | 4(5) |

Table 3

| TDD UL/DL configuration | 0 | 1 | 2 | 3 | 4 | 5 | 6 | 7 | 8 | 9 |
|---|---|---|---|---|---|---|---|---|---|---|
| 2 | 4(7) | 6 | 8, 7, 4, 6 | 4 | 8 | 7 | 6 | 4, 6 (8, 7, 4, 6) | 4 | 4(8) |
| 4_A | 4(7) | 6(11) | 8,7,4, 6(12, 8, 7,11) | 6,4(6,5,4,7) | 8 | 7 | 6(7) | 6 | 4(5) | 4 |
| 4_B | 4(7) | 6(11) | 8,7, 6(12, 8, 7,11) | 6,5,4(6,5,4,7) | 8 | 7 | 6(7) | 6 | 5 | 4 |
| 4_C | 4(7) | 6(11) | 8,7,4(12, 8, 7,11) | 7,6,4(6, 5,4,7) | 8 | 7 | 7 | 6 | 4(5) | 4 |
| 4_D | 4(7) | 6(11) | 8,7(12, 8, 7,11) | 6, 5, 4, 7 | 8 | 5,4 | 7 | 6 | 5 | 4 |
| 3_A | 5 | 6(11) | 7, 6 (7, 6, 11) | 6,5 | 5,4 | | 6 | 6 | 5 | 4(8) |
| 3_B | 4 | 6(11) | 7, 6 (7, 6, 11) | 6,5,4 (6,5) | 4 (5,4) | | 6 | 6 | 4(5) | 4(5) |

METHOD, BASE STATION AND USER EQUIPMENT FOR RADIO COMMUNICATION IN RADIO COMMUNICATION SYSTEM

CROSS-REFERENCE TO RELATED APPLICATIONS

This application is a continuation of U.S. application Ser. No. 15/109,552, filed Jul. 1, 2016, which is based on PCT filing PCT/CN2015/071628, filed Jan. 27, 2015, and claims priority to CN 201410042432.9, filed Jan. 28, 2014, the entire contents of each are incorporated herein by reference.

FIELD

The present disclosure relates to the technical field of wireless communication, and in particular to a method, a base station and a UE (User Equipment) for performing wireless communication in a wireless communication system.

BACKGROUND

This section provides background information relating to the present disclosure, which is not necessarily prior art.

In traditional intra-base station carrier aggregation, a PUCCH (Physical Uplink Control Channel) may be transmitted only via an uplink primary carrier, a PUSCH (physical Uplink Shared Channel) and a SRS (Sounding Reference Signal) may be transmitted via a SCC (Secondary Component Carrier), and a PRACH (Physical Random Access Channel) may be transmitted only when a terminal is to access a certain carrier.

The following three basic types of carrier aggregation are supported by any version after LTE (Long Term Evolution) Rel-12: 1) the FDD (Frequency Division Duplexing) carrier aggregation, or the TDD (Time Division Duplexing) carrier aggregation having the same intra-band configuration; 2) the TDD carrier aggregation having different uplink and downlink configurations; and 3) the carrier aggregation between FDD and TDD.

In particular, in a case that a larger number of small base stations are deployed and there exists a direct connection of optical fiber between a small base station and a macro base station, the traditional method where a PUCCH may be transmitted only via a primary carrier will causes the following issues for all of the three scenarios above: 1) it cannot share the burden of PUCCH for a node of a macro base station to release the burden of uplink control channel of the macro cell, especially in a case that the uplink time slots of the primary carrier is less and the HARQ (Hybrid Automatic Repeat Request) RTT (Round-Trip Time) of the primary carrier and a secondary carrier are different (for example, in a case that FDD cooperates with TDD while a TDD carrier serving as a primary carrier, or in a case of TDD having different configurations; it should be noted that the number of unlink subframes should be at most 60% of the total number of subframes); 2) the power consumption of the uplink transmission is over high when a macro cell carrier servers as a primary carrier; and 3) in a case that a TDD carrier servers as a primary carrier and the number of uplink subframes is less, it tends to have a higher PUCCH feedback time-delay and a higher retransmission time-delay of downlink data, effecting the QoS (Quality of Service) feeling of a user.

SUMMARY

This section provides a general summary of the present disclosure, and is not a comprehensive disclosure of its full scope or all of its features.

The object of the present disclosure is to provide a method, a base station and a user equipment for performing wireless communication in a wireless communication system, which may adjust flexibly a transmission carrier for uplink signals, especially for PUCCH, improving the transmission effectiveness of downlink data while optimizing the transmission performance of uplink signals.

According to an aspect of the present disclosure, it is provided a method for performing wireless communication in a wireless communication system, the wireless communication system including a base station and a user equipment, the user equipment communicating with the base station via multiple component carriers in a manner of carrier aggregation, the method including: assigning, by the base station, a priority to each component carrier such that the user equipment selects a component carrier with the highest priority on overlapping uplink subframes to transmit an uplink signal, based on at least one of: an expected power loss for transmission of the uplink signal on the component carrier; a burden for transmission of the uplink signal on the component carrier; the number of the uplink subframes of the component carrier; and primary/secondary attribute for a component carrier transmitting a downlink signal corresponding to the uplink signal transmitted on the component carrier.

According to another aspect of the present disclosure, it is provided a base station for performing wireless communication in a wireless communication system, the wireless communication system including the base station and a user equipment, the user equipment communicating with the base station via multiple component carriers in a manner of carrier aggregation, the base station including: a priority assigning unit for assigning a priority to each component carrier such that the user equipment selects a component carrier with the highest priority on overlapping uplink subframes to transmit an uplink signal, based on at least one of: an expected power loss for transmission of the uplink signal on the component carrier; a burden for transmission of the uplink signal on the component carrier; the number of the uplink subframes of the component carrier; and primary/secondary attribute for a component carrier transmitting a downlink signal corresponding to the uplink signal transmitted on the component carrier.

According to another aspect of the present disclosure, it is provided a user equipment for performing wireless communication in a wireless communication system, the wireless communication system including a base station according to the present disclosure and the user equipment, the user equipment communicating with the base station via multiple component carriers in a manner of carrier aggregation, the user equipment including: a receiving unit for receiving a message on setting and changing of the priority of the component carrier and information on determination rule of feedback timing of a PUCCH signal transmitted by the base station; a selecting unit for selecting a component carrier with the highest priority among aggregated carriers in which overlapping of uplink subframes occurs, and for selecting scheduling timing of a PUSCH signal and the feedback timing of the PUCCH signal according to the determination rule of the feedback timing when overlapping of downlink subframes occurs in the aggregated carriers; and a transmitting unit for transmitting an uplink signal through the component carrier, the feedback timing of the PUCCH signal, and the scheduling timing of the PUSCH signal selected by the selecting unit, or for transmitting an uplink signal according to a component carrier, the feedback timing of the PUCCH signal, and the scheduling timing of the PUSCH signal designated dynamically by a DCI signaling in the overlapping downlink subframes.

With the method, the base station and the user equipment for performing wireless communication in a wireless communication system according to the present disclosure, the user equipment is enabled to, by means of assigning a priority for each of multiple component carriers, select one of the multiple component carriers based on the priorities to transmit an uplink signal. Further, feedback timing of overlapping downlink subframes are determined based on at least one of time-delay requirement of service of the user equipment, energy saving requirement of the user equipment, and implementation complexity. In this way, it is possible to adjust flexibly a transmission carrier for uplink signals, especially for PUCCH, optimizing the transmission performance of uplink signals.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings:

FIG. 4 is a schematic diagram of TDD uplink and downlink configurations;

FIG. 5 is a schematic diagram of downlink HARQ PUCCH feedback timing based on time-delay;

FIG. 6 is a schematic diagram of downlink HARQ PUCCH feedback timing based on a criterion of energy saving first;

Figure 1:
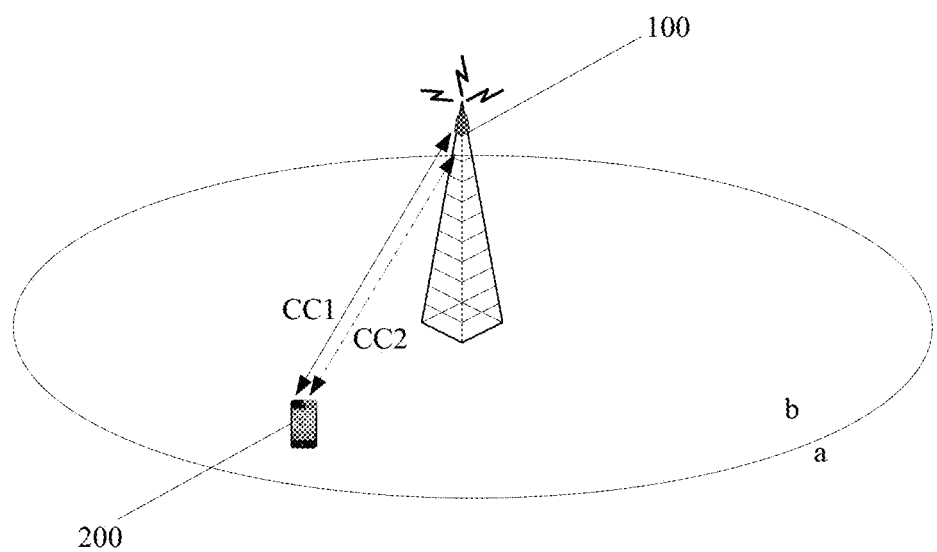
FIG. 1 is a schematic diagram of a scenario of intra-base station carrier aggregation.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Below various scenarios to which the technique according to an embodiment of the present disclosure can be applied are described with reference to FIGS. 1 to 3.

FIG. 1 illustrates a scenario of intra-base station carrier aggregation. In the scenario shown in FIG. 1, a UE (User Equipment) 200 communicates with a macro base station 100 via two component carriers CC1 and CC2 in a manner of carrier aggregation. The coverage area a of the component carrier CC1 is larger than the coverage range b of the component carrier CC2, and the frequency bin of the component carrier CC1 is lower than that of the component carrier CC2.

Figure 2:
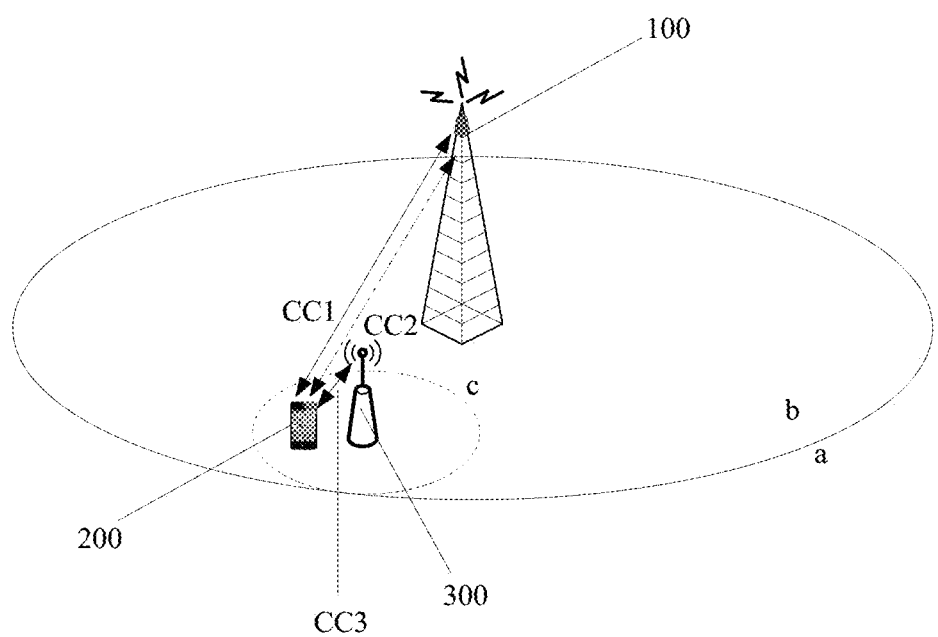
FIG. 2 is a schematic diagram of a scenario of inter-base station carrier aggregation.

FIG. 2 illustrates a scenario of inter-base station carrier aggregation. In the scenario shown in FIG. 2, a UE 200 communicates with a macro base station 100 via two component carriers CC1 and CC2 in a manner of carrier aggregation, and further communicates with a LPN (Low Power Node) 300 via a component carrier CC3. The coverage area a of the component carrier CC1 is larger than the coverage area b of the component carrier CC2, and the coverage area b of the component carrier CC2 is larger than the coverage area c of the component carrier CC3. Further, the frequency bin of the component carrier CC1 is lower than that of the component carrier CC2, and the frequency bin of the component carrier CC2 is lower than that of the component carrier CC3.

Figure 3:
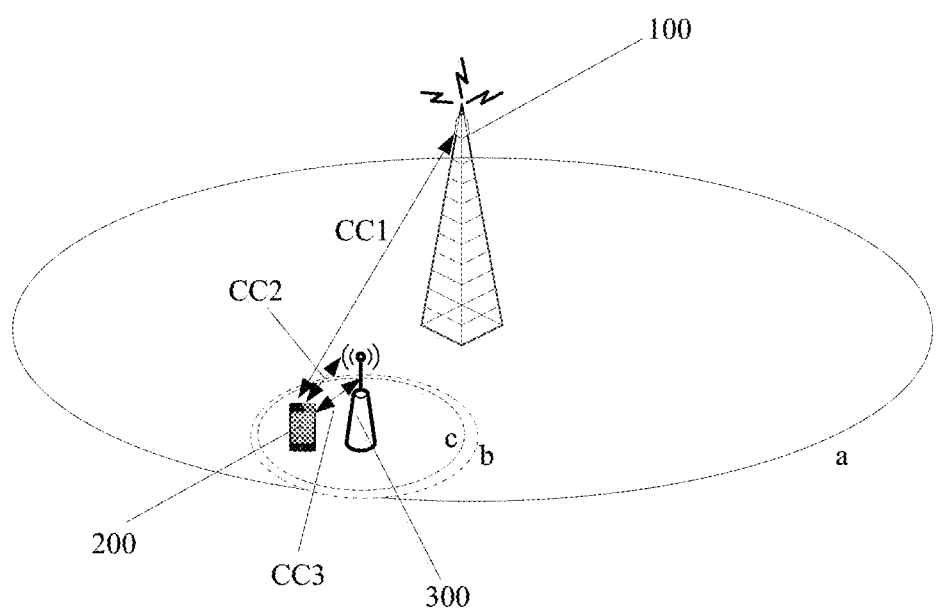
FIG. 3 is a schematic diagram of another scenario of inter-base station carrier aggregation.

FIG. 3 illustrates another scenario of inter-base station carrier aggregation. In the scenario shown in FIG. 3, a UE 200 communicates with a macro base station 100 via a component carrier CC1 in a manner of carrier aggregation, and further communicates with a LPN 300 via a component carrier CC2 and a component carrier CC3. The coverage area a of the component carrier CC1 is larger than the coverage area b of the component carrier CC2, and the coverage area b of the component carrier CC2 is larger than the coverage area c of the component carrier CC3. Further, the frequency bin of the component carrier CC1 is lower than that of the component carrier CC2, and the frequency bin of the component carrier CC2 is lower than that of the component carrier CC3.

FIGS. 1 to 3 only illustrate example scenarios to which the technical solution according to an embodiment of the present disclosure can be applied, and the disclosure is not limited thereto. For example, the number of the component carrier for carrier aggregation is not limited to two or three, and it is possible more than three. In addition, in the scenario shown in FIG. 1, UE 200 communicates with the macro base station 100 in a manner of carrier aggregation. However, UE 200 may also communicate with LPN 300 in a similar way.

As mentioned in the section of Background, the following three basic types of carrier aggregation are supported by any version after LTE (Long Term Evolution) Rel-12: 1) the FDD (Frequency Division Duplexing) carrier aggregation, or the TDD (Time Division Duplexing) carrier aggregation having the same intra-band configuration; 2) the TDD carrier aggregation having different uplink and downlink configurations; and 3) the carrier aggregation between FDD and TDD.

In the first type of carrier aggregation, since the HARQ (Hybrid Automatic Repeat Request) timing of a primary carrier is the same as that of a secondary carrier, the original mechanism of performing PUCCH (Physical Uplink Control Channel) feedback based on the primary carrier will not affect the feedback time-delay and further the QoS (Quality of Service) feeling of a user. Therefore, in a case that the PUCCH capacity of the primary carrier is sufficient (which means all of the downlink data transmission can have feedback), a flexible data transmission may be achieved with all of the downlink resources. In summary, for the first type of carrier aggregation, there is no such need to reduce feedback time-delay. It is mainly concerned in the present disclosure how to share the burden of PUCCH on the primary carrier and how to reduce the power consumption for transmitting an uplink signal by a user equipment.

In the second type of carrier aggregation, if uplink subframes of a TDD primary carrier is a superset of uplink subframes of a TDD secondary carrier (that is, downlink subframes of the primary carrier is a subset of downlink subframes of the secondary carrier), an existing technical solution is to follow a downlink HARQ timing of the secondary carrier itself in a case that the secondary carrier performs self-scheduling, or to follow a downlink HARQ timing of the primary scheduling carrier in a case of cross carrier scheduling. Since the uplink subframes of the primary carrier is a superset of the uplink subframes of other carrier, PUCCH feedback resources can always be obtained from the primary carrier no matter whether the carrier are in individual self-scheduling or in cross carrier scheduling, and no matter whether to follows its own PUCCH feedback timing or follow the PUCCH feedback timing of the primary scheduling carrier. Therefore, the downlink resources of the secondary carrier will not be wasted as long as the self-scheduling is adopted for non-overlapping subframes and the cross carrier scheduling or the self-scheduling is adopted for overlapping subframes.

Further, if uplink subframes of a TDD primary carrier is a subset of uplink subframes of a TDD secondary carrier (that is, downlink subframes of the primary carrier is a superset of downlink subframes of the secondary carrier), the existing technical solution is to follow the downlink HARQ timing of the primary carrier no matter whether the secondary carrier is in the cross carrier scheduling or in the self-scheduling. Although the downlink resources of the secondary carrier will not be wasted in this way, the overall feedback time-delay increases because of the less uplink time slots of the primary carrier, especially for some downlink subframes in configurations 2-5.

FIG. 4 illustrates seven different configurations for TDD uplink and downlink, in which a shaded grid represents a downlink subframe, and a non-shaded grid represents an uplink subframe. A number n in a non-shaded grid indicates that A/N information of the present uplink subframe is obtained based on the downlink data feedback of previous n subframes. Among the seven configurations, the combinations of configurations {1, 3}, {2, 3} and {2, 4} are neither in a superset relation nor in a subset relation between uplink and downlink subframes. The combination of configuration {1, 3} follows the downlink HARQ timing of configure 4, and the other two combinations follow the downlink HARQ timing of configure 5. Such adjustment of timing enables all of the aggregated downlink resources to be scheduled, but also results in sharply rising uplink feedback burden of uplink subframe 2 and/or uplink subframe 3. Especially in the case of configuration 5 where only 1 uplink feedback subframe exists, the feedback may be performed only by A/N Bundling (i.e., A is fed-back only if all of downlink subframes are received correctly, otherwise N is fed-back). This may result in unnecessary downlink retransmission, and also a jam of uplink feedback resources of a feedback carrier because the burden of PUCCH feedback cannot be shared to other time slots.

Particularly, in a case of the third type, i.e., the FDD-TDD carrier aggregation, if a TDD carrier serves as a primary carrier, it is possible that corresponding uplink transmission resources cannot be obtained when following downlink HARQ transmission timing of FDD, because less carrier resources are configured for the TDD carrier. In this case, in addition to adding the uplink feedback burden of the TDD primary carrier, it may cause a waste of some of the FDD downlink resources (because of discarding of downlink transmission due to lack of corresponding uplink resources for feedback), or failing to retransmit effectively following the FDD downlink HARQ timing (because feedback cannot be obtained even when downlink transmission is performed and thus it is impossible to retransmit).

Therefore, it is desired to provide a technical solution to perform wireless communication in a wireless communication system, by which a transmission carrier for uplink signals, especially for PUCCH, may be selected dynamically in order to ensure the transmission effectiveness of the network with limited PUCCH capacity, and which may also be adjusted dynamically based on at least one of load condition of PUCCH of a cell and the power consumption of PUCCH transmission of a terminal. Further, the dynamic adjustment for the PUCCH transmission will result in changes about feedback time slot of downlink HARQ in the above second and third types of carrier aggregation. Thus, such issue is also considered in the present disclosure to optimize a design for transmission via air interface.

According to an embodiment of the present disclosure, there is provided a method for performing wireless communication in a wireless communication system. As shown in FIGS. 1 to 3, the wireless communication system includes a base station, such as a macro base station 100 and/or a LPN 300, and user equipment, such as UE 200. The user equipment communicates with the base station via multiple component carriers, such as CC1, CC2 or CC3, in a manner of carrier aggregation. The method includes assigning by the base station a priority to each component carrier based on at least one of an expected power loss for transmission of the uplink signal on the component carrier, a burden for transmission of the uplink signal on the component carrier, the number of the uplink subframes of the component carrier, and primary/secondary attribute for a component carrier transmitting a downlink signal corresponding to the uplink signal transmitted on the component carrier. The user equipment is enabled to select a component carrier with the highest priority on overlapping uplink subframes to transmit an uplink signal.

In the method according to the embodiment of the present disclosure, the PUCCH is not limited to transmit via only a uplink primary carrier, but may transmit via one of multiple carriers selected based on the priorities. In this way, the transmission carrier of the PUCCH may be adjusted flexibly, optimizing the transmission performance of the downlink data and PUCCH.

According to an embodiment of the present disclosure, the uplink signal may include at least one of a PUCCH signal and a PUSCH (Physical Uplink Shared Channel) signal. Further, the base station may include at least one of a macro base station and a low power node.

In the method according to an embodiment of the present disclosure, when the priority is assigned based on the number of the uplink subframes of the component carrier, a higher priority may be assigned to a component carrier with more uplink subframes. Specifically, the priority of a FDD carrier may be higher than that of a TDD carrier. In addition, TDD component carriers in the following configurations may have lower priorities in an order: configuration 0, configuration 6, configuration 1, configuration 3, configuration 4 and configuration 5. A TDD component carrier in configuration 2 may have the same priority as a TDD component carrier in configuration 4.

In the method according to an embodiment of the present disclosure, when the priority is assigned based on the primary/secondary attribute for the component carrier transmitting the downlink signal, if the component carrier transmitting the downlink signal is a primary component carrier, then a higher priority may be assigned to the corresponding component carrier transmitting the uplink signal. Correspondingly, if the component carrier transmitting the downlink signal is a secondary component carrier, then a lower priority may be assigned to the corresponding component carrier transmitting the uplink signal.

In the method according to an embodiment of the present disclosure, when the priority is assigned based on the burden for transmission of the uplink signal on the component carrier, a lower priority may be assigned to a component carrier providing a larger coverage area and/or providing service for more user equipments. Correspondingly, a higher priority may be assigned to a component carrier providing a smaller coverage area and/or providing service for less user equipments. The base station may determine the coverage area of a carrier based on the magnitude of the band of the carrier and a factor such as whether a relay amplifier is configured. Generally, a carrier in a lower band has a larger coverage area, and a carrier which is in the same band as other carriers and is configured with a relay amplifier has a larger coverage area.

In the method according to an embodiment of the present disclosure, when the priority is assigned based on the expected power loss for transmission of the uplink signal on the component carrier, a higher priority may be assigned to a component carrier with a lower expected power loss. Further, the expected power loss is determined based on the coverage area of the carrier and/or downlink path loss. For example, in a case that the base station includes only one of a macro base station and a LPN, a higher priority may be assigned to a component carrier with a lower frequency bin. In a case that the base station includes both the macro base station and the LPN, a higher priority may be assigned to a component carrier belonging to the LNP.

According to an embodiment of the present disclosure, in a case that the uplink signal is a PUCCH signal and the PUCCH signal contains feedback information, the base station may further assign the priority based on feedback time-delay of the PUCCH signal of the component carrier.

In the method according to an embodiment of the present disclosure, when the priority is assigned based on the feedback time-delay of the PUCCH signal of the component carrier, a FDD component carrier may have a higher priority than a TDD component carrier. In addition, TDD component carriers in the following configurations may have lower priorities in an order: configuration 0, configuration 1, configuration 6, configuration 3, configuration 4 and configuration 5. A TDD component carrier in configuration 2 may have the same priority as a TDD component carrier in configuration 3.

For example, when a PUCCH resource is transmitted via overlapping uplink subframes on an intra-base station aggregated carrier, in the cases shown in FIGS. 1 and 2, the overall power consumption for PUCCH feedback of the component carrier CC1 should be lower than that of component carrier CC2. However, the PUCCH feedback burden of component carrier CC1 is higher than that of component carrier CC2 because the coverage area of component CC1 is larger. Thus, a priority for PUCCH feedback of component carrier CC2 may be assigned higher than that of component carrier CC1 for some carrier aggregation terminals. When UE 200 in FIG. 2 is in inter-base station carrier aggregation, both the PUCCH burden and feedback consumption of component carrier CC3 are the least due to the distance from UE 200 and its coverage area. Therefore, the feedback priorities in FIG. 2 may be assigned as: CC3>CC2>CC1.

Similarly, when a PUCCH resource is transmitted via overlapping uplink subframes on an intra-base station aggregated carrier, in the case shown in FIG. 3, the power consumption for PUCCH feedback of the component carrier CC2 should be lower than that of component carrier CC3 in general. Meanwhile, the overall PUCCCH feedback burden is not high due to the less number of users of LPN 300. Thus, a priority for PUCCH feedback of component carrier CC2 may be assigned higher than that of component carrier CC3. When UE 200 in FIG. 3 is in inter-base station carrier aggregation, both the PUCCH burden and feedback consumption of component carrier CC1 are the most due to the distance from UE 200 and its coverage area. Therefore, the feedback priorities in FIG. 3 may be assigned as: CC2>CC3>CC1.

According to an embodiment of the present disclosure, the base station may notify the user equipment of a message on setting and changing of the priority of the component carrier via a RRC (Radio Resource Control) signaling or a MAC (Media Access Control) signaling.

That is, when the priority is changed, the base station may notify the user equipment of the change in priority via a RRC signaling or a MAC signaling.

Thereby, the user equipment is enabled to select a component carrier with the highest priority to transmit an uplink signal.

It should be noted that the base station in the present disclosure may evaluate the priority of a component carrier based on multiple rules. Specifically, for example, it is possible to evaluate priorities respectively based on multiple rules and then determine comprehensively a finial priority based on the multiple evaluated results, or it is possible to select a rule among the multiple rules dynamically according to specific conditions and evaluate a priority based on the selected rule. Furthermore, the rule for evaluating a priority by the base station in the present disclosure may be static. For example, the base station may evaluate a priority fixedly based on at least one rule among others. The above cases will not be described in detail.

It is described above the dynamic adjustment among multiple component carriers for transmitting uplink signals. As mentioned above, the dynamic adjustment for uplink signals such as PUCCH will result in changes in feedback time slot of downlink HARQ in the above second and third types of carrier aggregation. It will be described below how to deal with such issue to optimize a design for transmission via air interface. It should be noted that the following technical solution does not necessarily rely on the above uplink dynamic adjustment solution, and may be implemented separately to solve a corresponding technical problem.

The uplink transmission resources that may be obtained in time domain by an aggregated carrier are a union of that of all the aggregated carriers. Thus, in a case of supporting dynamic PUCCH feedback adjustment, each TDD carrier may determine its PUCCH feedback time slot based on the transmission timing of its downlink PDSCH (Physical Downlink Shared Channel), and may follow its PUCCH feedback timing for a non-overlapping downlink subframe. Among the aggregated carriers, all of FDD carriers follow the same timing, and all of TDD carriers with the same uplink and downlink configuration follow the same timing. Meanwhile, when the PUCCH feedback timing is determined, the PUSCH scheduling timing of individual carrier may be remaining the same as the PUCCH feedback timing or following the original PUSCH scheduling timing.

According to an embodiment of the present disclosure, when there are overlapping downlink subframes among the multiple component carriers and there is transmission of PDSCH on the overlapping downlink subframes, the base station and/or the user equipment may determine feedback timing of a PUCCH signal corresponding to the component carrier for which there is the transmission of PDSCH on the overlapping downlink subframes, based on at least one of: feedback timing of a component carrier with the highest priority among uplink component carriers corresponding to the component carrier for which there is the transmission of PDSCH on the overlapping downlink subframes; feedback timing of a component carrier with the lowest feedback time-delay among uplink component carriers corresponding to the component carrier for which there is the transmission of PDSCH on the overlapping downlink subframes; feedback timing of a primary scheduling component carrier in a process of cross carrier scheduling; and feedback timing of the component carrier per se for which there is the transmission of PDSCH on the overlapping downlink subframes.

Preferably, in a case that the feedback timing of the PUCCH signal is determined based on the feedback timing of the component carrier with the highest priority or the feedback timing of the component carrier with the lowest feedback time-delay, if obtained time-delay gain or uplink transmission power gain is lower than a predetermined threshold and the number of downlink subframes associated with uplink subframes for transmitting the PUCCH signal of the component carrier is caused to be increased and exceed two, the feedback timing of the component carrier per se for which there is the transmission of PDSCH on the overlapping downlink subframes may be selected as the feedback timing of the PUCCH signal.

Furthermore, the base station may select, as scheduling timing of a PUSCH signal of the component carrier on the overlapping downlink subframes corresponding to the overlapping downlink subframes, one of: feedback timing of the PUCCH signal of the component carrier; and scheduling timing of the PUSCH signal of the current component carrier.

According to an embodiment of the present disclosure, the base station may determine the rule of the feedback timing of the PUCCH signal based on at least one of time-delay requirement of the downlink signal, energy saving requirement of the user equipment, and implementation complexity.

Further, the base station may notify the user equipment of the determination rule of the feedback timing of the PUCCH signal with which the component carrier is to comply via a RRC signaling or a MAC signaling.

Furthermore, when it is required to adjust dynamically the PUCCH feedback carrier and/or the PUCCH feedback timing of the component carrier performing PDSCH transmission on the overlapping downlink subframes, the PUCCH feedback carrier on the overlapping downlink subframes and/or the feedback timing of the PUCCH signal corresponding to the PDSCH transmission of the component carrier may be designated dynamically by utilizing newly added bit information or redundancy for DCI (Downlink Control Information) of PDSCH scheduling.

For example, the PUCCH feedback carrier on the overlapping downlink subframes and/or the feedback timing of the PUCCH signal corresponding to the PDSCH transmission of the component carrier may be designated by adding a bit to the DCI.

Below, the case of carrier aggregation between FDD and TDD, i.e., the third type of carrier aggregation will be described first in detail.

The PUCCH feedback of a TDD aggregated carrier may be performed following the original timing or the FDD timing. For example, in a case that a TDD carrier is in configuration 5, if the PUCCH feedback is performed following the original timing, the downlink transmission time-delay is much longer than following the FDD timing, and there is a need using A/N Bundling, so as to decrease the accuracy of feedback. However, in a case that a TDD carrier is in configuration 0, performing the feedback following the original timing is not so different from performing the feedback following the FDD timing. Therefore, in the case of carrier aggregation between FDD and TDD, the configurations where the number of the association between uplink subframe and downlink subframes is more than 2, are configurations 2, 3, 4 and 5 in FIG. 4, the carriers with these configurations preferably follows the FDD timing in order to avoid A/N Bundling and a long time-delay. The configurations other than configuration 0 each has a RTT (Round-Trip Time) of downlink HARQ timing more than 10 ms, for which it is advantageous for reducing the time-delay of retransmission of data and improving the Qos feeling for real-time services if performing the feedback by following the FDD timing. A FDD carrier only follows its own downlink HARQ feedback timing.

However, in a case of inter-base station carrier aggregation, assuming a FDD carrier servers as a macro carrier and a TDD carrier servers as a serving carrier of LPN, if following the timing of the FDD carrier, the feedback is performed via the TDD carrier for overlapping uplink subframes and via the FDD carrier for a non-overlapping uplink subframe, which case has more power consumption than the case that UE performs PUCCH feedback on the TDD carrier following the TDD timing for an overlapping downlink subframe. For example, in the case that a FDD carrier serves as a macro base station carrier and a TDD carrier in the uplink and downlink configuration 5 servers as a low power node carrier, if the TDD carrier performs the HARQ feedback following the FDD timing, only subframe 2 can perform PUCCH feedback, apparently increasing greatly the power consumption of the UE. Therefore, in this case, for transmission of downlink non real-time service, it is more advantageous for saving the PUCCH transmission power of the UE if the TDD carrier follows its own PUCCH feedback timing or the PUCCH feedback timing of another TDD carrier of the same node. The FDD macro carrier is more suitable for transmitting real-time services because of the ability of ensuring a lower PUCCH feedback time-delay. Especially, when the UE may use multiple aggregated TDD carriers of the LPN, it is possible to select the PUCCH feedback timing of a carrier with a lower frequency bin among the TDD carriers of the LPN for overlapping downlink subframes in order to reduce the power consumption of the UE for feedback, or select the PUCCH feedback timing with lower time-delay in the LPN, or follow the PUCCH feedback timing of a primary scheduling carrier in a case that the cross carrier scheduling is adopted within the LPN.

In the above cases, a static feedback timing of a TDD carrier is determined based on criterions of time-delay requirement of a service, energy saving requirement of a terminal, and implementation complexity. The base station may notify the UE of a static timing that should be followed by individual aggregated carriers or all of aggregated carriers via RRC/MAC signaling. Under the requirements of energy saving, time-delay and load sharing of PUCCH, the PUCCH feedback timing of overlapping downlink subframes may be adjusted dynamically. That is, the DCI of PDSCH scheduling followed by the subframe may designate dynamically the downlink subframe should follow the PUCCH feedback timing of which TDD configuration/ aggregated carrier.

Next, the case of the TDD carrier aggregation having different unlink and downlink configurations, i.e., the second type of carrier aggregation will be described in detail.

Mostly different from a FDD carrier in the carrier aggregation between FDD and TDD, a TDD carrier which has a position of superset for unlink subframes has a position of subset for the downlink subframes, while the FDD carrier has a position of superset for both uplink subframes and downlink subframes with respect to a TDD carrier; and a TDD uplink carrier in a superset does not necessarily just follow its own PUCCH feedback timing. In the case of TDD carrier aggregation having different unlink and downlink configurations, in addition to following its own feedback timing, a TDD carrier may, for example, select an uplink time slot with a short feedback time to transmit PUCCH if an overlapping downlink subframe has multiple time points for feedback, or follow the timing of a primary scheduling carrier in a case of cross carrier scheduling, or follow the timing of a carrier of a node with lower power consumption, or the uplink feedback timing may follow a PUCCH feedback timing of a uplink and downlink configuration where the number and positions of subframes in the intersection set of uplink subframes are the same in a case that the uplink and downlink subframes of an aggregated carrier are not in a superset or subset relation.

FIG. 5 shows an exemplary determined PUCCH feedback timing for a specific set of carrier aggregation configurations complying with a criterion of least feedback time which is suitable for a real-time service and a further optimized technical solution. In FIG. 5, a shaded grid represents a downlink subframe, and a non-shaded grid represents an uplink subframe. A number n in a non-shaded grid indicates that A/N information of the present uplink subframe is obtained based on the downlink data feedback of previous n subframes. Further, in FIG. 5, in a grid without a blanket, a numerical value indicates a numerical value of the original timing, and in a grid with a blanket, a numerical value inside the blanket indicates a numerical value of the original timing, and a numeric value outside the blanket indicates a numerical value of adjusted timing. Here, the basic principle for adjusting a numerical value of a downlink subframe is to take a smaller numerical value when comparing among different configurations.

Referring to Table 1 in FIG. 5, in a case that aggregated carriers are in an uplink superset or subset relation, it can be seen that in configuration 6_A, the saved time-delay of the downlink subframes for which timing is changed are all greater than or equal to 3 ms, except subframe 6. Subframe 6 in configuration 6, which follows the timing of configuration 3 after adjusted, saves 1 ms, having limited effect on the QoS of real-time data transmission. Thus, subframe 6 may remain the feedback timing unchanged, i.e., follow the feedback timing in configuration 6_B.

Referring to Table 2 in FIG. 5, in a case that an aggregated carriers are not in an uplink superset or subset relation (i.e., a combination of only configurations 1 and 3), if complying with the criterion of optimizing the feedback time-delay, subframe 9 may only save a time-delay of 1 ms (as configuration 3_B). However, the number of feedback time slots of subframe 3 in configuration 3_B is increased. Furthermore, in a case that an uplink subframe supports the double codeword feedback without performing A/N Bundling, an uplink subframe may be associated with at most two downlink subframes at once. Subframe 3 in configuration 3 B is changed to be associated with three subframes rather than the original two subframes, thereby having to performing A/N Bundling to support the most numbers of feedback subframes and codewords. In this case, if subframe 9 remains the original scheduling as configuration 3, it can be ensured that no A/N Bundling needs to be performed for any PUCCH feedback in the combination. Therefore, configuration 3_A in Table 2 is a better resultant timing adjustment.

Further, assuming adding an aggregated carrier in configuration 4, the timing of configuration 1 or 3 does no change while the time-delay of subframe 6 and subframe 8 in configuration 4 can be optimized by 1 ms. It can be seen from the four configuration options, performing time-delay optimization on at least one subframe is better than remaining original PUCCH feedback timing for all of subframes. The reason is, among subframe 2 and subframe 3, a subframe that is possible to perform A/N Bundling has only 3 associated downlink carriers, while subframe 3 in configuration 4_B in Table 2 has 4 associated downlink carriers, increasing greatly the possibility of A/N Bundling.

Referring to Table 3 in FIG. 5, in a case of configuring the carrier aggregation of configurations 2, 3 and 4, the time-delay of subframe 6 and subframe 8 in configuration 4 can still be optimized by 1 ms. In a case of remaining unchanged or optimizing for all of subframes, only one uplink subframe may possibly need to perform A/N Bundling, but this uplink subframe needs to be associated with 4 downlink subframes, having a higher possibility of A/N Bundling. However, if performing the PUCCH feedback time-delay optimization for only subframe 6 or subframe 8, then subframe 2 and subframe 3 each have the possibility of A/N Bundling because each of them is associated with 3 downlink subframes.

In a case of transmission of non real-time service, the PUCCH feedback timing of a carrier with the least power consumption may be followed for overlapping downlink subframes. Alternatively, the multiple optional PUCCH feedback timing of overlapping downlink subframes may be ranked in the ascending order according to their time-delay, and the feedback timing with the lowest time-delay may be selected to be followed if corresponding uplink resources can be obtained on a carrier or a carrier cluster when following the feedback timing with the lowest time-delay. In this way, the timing adjustment as shown in Table 6 of FIG. 6 may be obtained.

Figure 6:
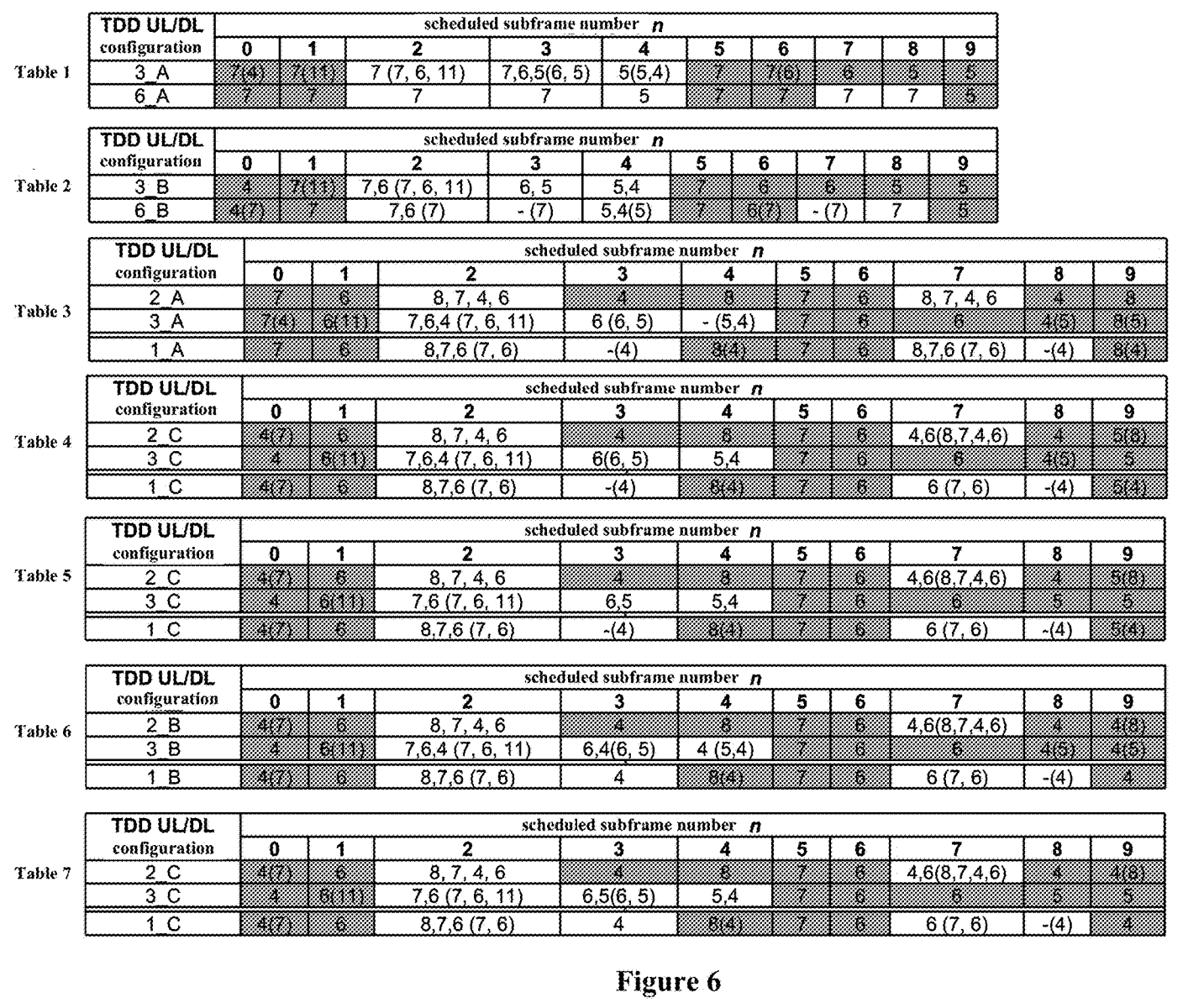

FIG. 6 illustrates downlink HARQ PUCCH feedback timing based on the criterion of energy saving first. Similarly, in FIG. 6, a shaded grid represents a downlink subframe, and a non-shaded grid represents an uplink subframe. A number n in a non-shaded grid indicates that A/N information of the present uplink subframe is obtained based on the downlink data feedback of previous n subframes. Further, in FIG. 6, in a grid without a blanket, a numerical value indicates a numerical value of the original timing, and in a grid with a blanket, a numerical value inside the blanket indicates a numerical value of the original timing, and a numeric value outside the blanket indicates a numerical value of adjusted timing.

The following is described with an example of two aggregated carriers in configuration {3,6} (the embodiment may be applicable to any cases of carrier aggregation having a configuration in uplink superset or subset relation). If the carrier in configuration 6 serves as an uplink carrier with lower power consumption, the simplest adjustment is that the carrier in configuration 3 completely follows the PUCCH feedback timing of the carrier in configuration 6 for any overlapping downlink subframes, as shown in Table 1 of FIG. 6. However, time-delay is added unnecessarily for time slot 0 because, when following the timing of the carrier in configuration 3, subframe 4 of the carrier in configuration 6 may be also used for PUCCH feedback of subframe 0. Further, the adjustment to the timing of subframe 6 results in added time-delay of 1 ms. Among multiple optional PUCCH feedback timing for overlapping downlink subframes, the downlink subframes 0, 1, and 6 have different PUCCH feedback time slot, but all have corresponding uplink resources on the low power consumption carrier in configuration 6 which is configured based on the criterion of least time-delay. Therefore, the timing may be adjusted as Table 2 of FIG. 6. Certainly, it may remain following the original feedback timing since only 1 ms is saved for the time-delay of subframe 6 of the carrier in configuration 6.

In the scenario of inter-base station carrier aggregation, if an aggregated carrier of a macro base station is in configuration 1, and two aggregated carriers of a LPN are in configurations 2 and 3 respectively in which the carrier in configuration 2 has a lower frequency bin than the carrier in configuration 3, then their power consumption is in an order as configuration 2, configuration 3 and configuration 1. Since the carriers in configurations 2 and 3 belong to the LPN, the difference between their PUCCH transmission power should be below a certain threshold, and thus the carriers in configurations 2 and 3 may be considered as a carrier cluster with low power consumption.

Referring to Table 3 of FIG. 6, if all of overlapping downlink carriers follows the PUCCH feedback timing of a carrier with the lowest power consumption, the time-delay of subframes 0 and 9 can be optimized by a certain extent, and the feedback capacity of subframe 2, 3 and 4 can be optimized by a certain extent (i.e., subframe 2 in configuration 3 has 3 associated downlink subframes, having a possibility of A/N Bundling, while the other two uplink subframes in configuration 3 each have sufficient feedback capacities for not performing A/N Bundling).

Further, if the criterion is changed to be that, among multiple optional PUCCH feedback timing for overlapping downlink subframes, an inter-base station overlapping downlink carrier, when appearing, follows the feedback timing of a carrier of the carrier cluster with the lowest power consumption which has the lowest feedback time-delay. In this case, if only an intra-base station overlapping downlink carrier appears, it follows the feedback timing with the lowest time-delay, thereby obtaining the timing adjustment as shown in Table 4 of FIG. 6.

However, the feedback capacity of subframes 2 and 4 in configuration 3 can be still optimized by a certain extent (i.e., subframe 2 in configuration 3 has 3 associated downlink subframes, having a possibility of A/N Bundling, while subframes 4 has sufficient feedback capacities for not performing A/N Bundling). Therefore, for downlink subframe 8 in configuration 3 of Table 4, corresponding uplink resources may be obtained on the carrier cluster with low power consumption if following the original PUCCH feedback timing, with only 1 ms of extra time-delay compared with the optimal time-delay, which will not result in an obvious effect on the service transmission. Table 5 of FIG. 6 shows the adjustment result.

Alternatively, the multiple optional PUCCH feedback timing of overlapping downlink subframes may be ranked in the ascending order according to their time-delay, and the feedback timing with the lowest time-delay may be selected to be followed if corresponding uplink resources can be obtained on a carrier or a carrier cluster when following the feedback timing with the lowest time-delay. In this way, the timing adjustment as shown in Table 6 of FIG. 6 may be obtained.

However, the feedback capacity of subframes 2 and 4 in configuration 3 can be still optimized by a certain extent (i.e., subframe 2 in configuration 3 has 3 associated downlink subframes, having a possibility of A/N Bundling, while subframes 4 has sufficient feedback capacities for not performing A/N Bundling). Therefore, for downlink subframes 8 and 9 in configuration 3 of Table 6, corresponding uplink resources may be obtained on the carrier cluster with low power consumption if following the original PUCCH feedback timing, with only 1 ms of extra time-delay compared to the optimal time-delay, which will not result in an obvious effect on the service transmission. Table 7 of FIG. 6 shows the adjustment result.

In the above cases, a static feedback timing of a TDD carrier is determined based on criterions of time-delay requirement of a service, energy saving requirement of a terminal, and implementation complexity. The base station may notify the UE of a static timing that should be followed by individual aggregated carriers or all of aggregated carriers. Under the requirements of energy saving, time-delay and load sharing of PUCCH, the PUCCH feedback timing of an overlapping downlink subframe may be adjusted dynamically. That is, the DCI of PDSCH scheduling of the subframe may design dynamically the downlink subframe should follow the PUCCH feedback timing of which TDD configuration/aggregated carrier.

If it is required to achieve dynamic timing adjustment and send a signaling for selected feedback carrier together with downlink data, it is possible to add 5 bits to DCI to notify of which carrier is selected for feedback in a manner of bitmap (for example, the carriers are numbered in a descending or ascending order according to their frequency bins, and the value 0 or 1 of a bit indicates that the carrier having a number corresponding to the bit does not perform PUCCH feedback, and the value 1 or 0 of a bit indicates that the carrier having a number corresponding to the bit performs PUCCH feedback) since a terminal currently supports at most 5 aggregated carriers. If further defining that the PUCCH feedback timing follows the timing of feedback carrier, 5 bits is sufficient to achieve the dynamic timing adjustment and feedback carrier adjustment. Otherwise, if it is required to adjust the default feedback timing, 5 extra bits are needed to specify the feedback timing of which carrier is to be followed.

Further, since the default feedback carrier and the carrier whose timing is followed by the default feedback carrier are known, the bitmap of 5 bits in the above example can be reduced to a bitmap of 4 bits to distinguish the other aggregated carriers. Alternatively, 2 bits may be further used to identify the carrier that performs PUCCH feedback or the carrier whose PUCCH feedback timing is to be followed.

According to an embodiment of the present disclosure, in a case of carrier aggregation in a wireless communication system, the downlink HARQ A/N feedback timing is adjusted based on multiple PUCCH feedback time points of overlapping downlink subframes of aggregation carriers, and the transmission carrier of PUCCH is adjusted flexibly based on overlapping uplink subframes, thereby optimizing the transmission performance of downlink data and PUCCH.

Figure 7:
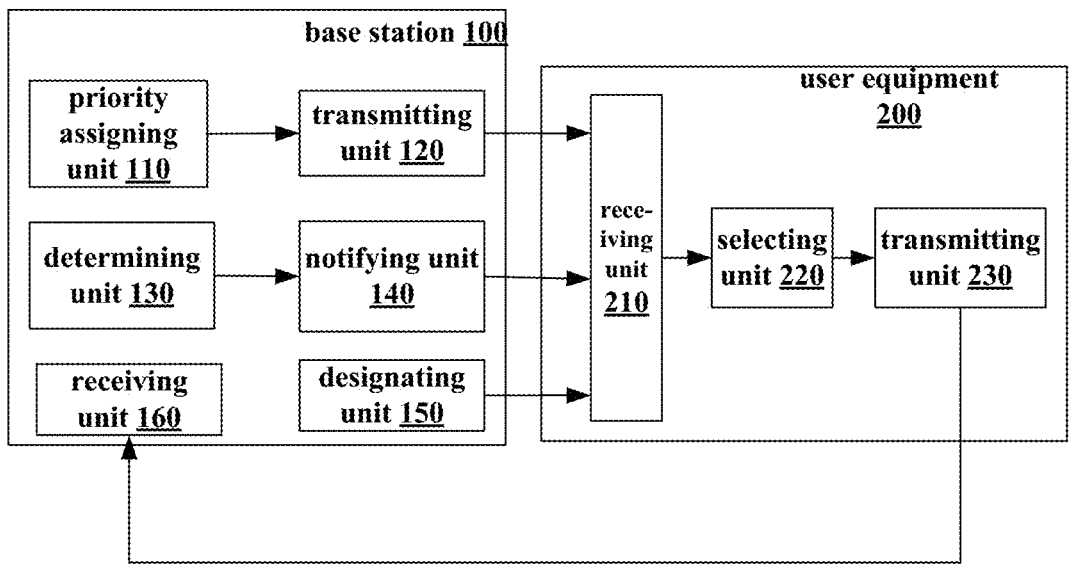
FIG. 7 is a block diagram of a wireless communication system according to an embodiment of the present disclosure.

Below a wireless communication system according to an embodiment of the present disclosure is described with reference to FIG. 7. Referring to FIG. 7, the wireless communication system according to an embodiment of the present disclosure includes a base station 100 and user equipment 200, the user equipment 200 communicating with the base station 100 via multiple component carriers in a manner of carrier aggregation. The base station 100 may include but not be limited to a priority assigning unit 110, a transmitting unit 120, a determining unit 130, a notifying unit 140, a designating unit 150 and a receiving unit 160, and the like. The user equipment 200 may include but not be limited to a receiving unit 210, a selecting unit 220 and a transmitting unit 230, and the like.

The priority assigning unit 110 may assign a priority to each component carrier such that the user equipment 200 selects a component carrier with the highest priority on overlapping uplink subframes to transmit an uplink signal, based on at least one of: an expected power loss for transmission of the uplink signal on the component carrier; a burden for transmission of the uplink signal on the component carrier; the number of the uplink subframes of the component carrier; and primary/secondary attribute for a component carrier transmitting a downlink signal corresponding to the uplink signal transmitted on the component carrier.

Preferably, the uplink signal may include at least one of a PUCCH signal and a PUSCH signal, and/or the base station 100 may include at least one of a macro base station and a low power node.

Preferably, when the priority is assigned by the priority assigning unit 110 based on the number of the uplink subframes of the component carrier, a higher priority may be assigned to a component carrier with more uplink subframes.

Preferably, when the priority is assigned by the priority assigning unit 110 based on the primary/secondary attribute for the component carrier transmitting the downlink signal, if the component carrier transmitting the downlink signal is a primary component carrier, then a higher priority may be assigned to the corresponding component carrier transmitting the uplink signal.

Preferably, when the priority is assigned by the priority assigning unit 110 based on the burden for transmission of the uplink signal on the component carrier, a lower priority may be assigned to a component carrier providing a larger coverage area and/or providing service for more user equipments.

Preferably, when the priority is assigned by the priority assigning unit 110 based on the expected power loss for transmission of the uplink signal on the component carrier, a higher priority may be assigned to a component carrier with a lower expected power loss.

Preferably, when the priority is assigned by the priority assigning unit 110 based on the expected power loss for transmission of the uplink signal on the component carrier, if the base station 100 only includes only one of a macro base station and a low power node, a higher priority may be assigned to a component carrier with a lower frequency bin, and if the base station 100 includes both of a macro base station and a low power node, a higher priority may be assigned to a component carrier belonging to the low power node.

Preferably, the uplink signal may be the PUCCH signal and the PUCCH signal may contain feedback information, and the priority assigning unit 110 may further assign the priority based on feedback time-delay of the PUCCH signal of the component carrier.

Preferably, when the priority is assigned by the priority assigning unit 110 based on the feedback time-delay of the PUCCH signal of the component carrier, a FDD component carrier may have a higher priority than a TDD component carrier, In addition, TDD component carriers with the following configurations may have lower priorities in descending order: configuration 0, configuration 1, configuration 6, configuration 3, configuration 4 and configuration 5. A TDD component carrier in configuration 2 may have the same priority as a TDD component carrier in configuration 3.

Further, the transmitting unit 120 may notify the user equipment 200 of a message on setting and changing of the priority of the component carrier via a RRC signaling or a MAC signaling.

That is, when a priority is changed, the transmitting unit 120 may notify the user equipment 200 of the changed priority via a RRC signaling or a MAC signaling.

Further, when there are overlapping downlink subframes among the multiple component carriers and there is transmission of PDSCH on the overlapping downlink subframes, the determining unit 130 may determine feedback timing of a PUCCH signal corresponding to the component carrier for which there is the transmission of PDSCH on the overlapping downlink subframes, based on at least one of: feedback timing of a component carrier with the highest priority among uplink component carriers corresponding to the component carrier for which there is the transmission of PDSCH on the overlapping downlink subframes; feedback timing of a component carrier with the lowest feedback time-delay among uplink component carriers corresponding to the component carrier for which there is the transmission of PDSCH on the overlapping downlink subframes; feedback timing of a primary scheduling component carrier in a process of cross carrier scheduling; and feedback timing of the component carrier per se for which there is the transmission of PDSCH on the overlapping downlink subframes.

Preferably, in a case that the feedback timing of the PUCCH signal is determined by the determining unit 130 based on the feedback timing of the component carrier with the highest priority or the feedback timing of the component carrier with the lowest feedback time-delay, if obtained time-delay gain or uplink transmission power gain is lower than a predetermined threshold and the number of downlink subframes associated with uplink subframes for transmitting the PUCCH signal of the component carrier is caused to be increased and exceed two, the feedback timing of the component carrier per se for which there is the transmission of PDSCH on the overlapping downlink subframes may be selected by the determining unit 130 as the feedback timing of the PUCCH signal.

Preferably, the determining unit 130 may select, as scheduling timing of a PUSCH signal of the component carrier on the overlapping downlink subframes corresponding to the overlapping downlink subframes, one of: feedback timing of the PUCCH signal of the component carrier; and scheduling timing of the PUSCH signal of the current component carrier.

Preferably, the determining unit 130 may determine the rule of the feedback timing of the PUCCH signal based on at least one of time-delay requirement of the downlink signal, energy saving requirement of the user equipment, and implementation complexity.

Further, the notifying unit 140 may notify the user equipment 200 of the determination rule of the feedback timing of the PUCCH signal with which the component carrier is to comply via a RRC signaling or a MAC signaling.

Further, when it is required to adjust dynamically the PUCCH feedback carrier and/or the PUCCH feedback timing of the component carrier performing PDSCH transmission on the overlapping downlink subframes, the designating unit 150 may designate dynamically the PUCCH feedback carrier on the overlapping downlink subframes and/or the feedback timing of the PUCCH signal corresponding to the PDSCH transmission of the component carrier, by utilizing newly added bit information or redundancy for DCI of PDSCH scheduling.

Preferably, the designating unit 150 may designate dynamically the PUCCH feedback carrier on the overlapping downlink subframes and/or the feedback timing of the PUCCH signal corresponding to the PDSCH transmission of the component carrier, by adding a bit to the DCI.

Further, the receiving unit 210 of the user equipment 200 may receive a message on setting and changing of the priority of the component carrier transmitted by the base station 100. The receiving unit 210 may also receive determination rule of feedback timing of a PUCCH signal to be followed by a component carrier which is notified by the notifying unit 140, and the PUCCH feedback carrier on the overlapping downlink subframes and/or the feedback timing of the PUCCH signal corresponding to the PDSCH transmission of the component carrier which is designed by the designating unit 150, and the like.

The selecting unit 220 may select a component carrier with the highest priority among aggregated carriers in which overlapping of uplink subframes occurs, and select scheduling timing of a PUSCH signal and the feedback timing of the PUCCH signal according to the determination rule of the feedback timing when overlapping of downlink subframes occurs in the aggregated carriers.

The transmitting unit 230 may transmit an uplink signal through the component carrier, the feedback timing of the PUCCH signal, and the scheduling timing of the PUSCH signal selected by the selecting unit 220, or the transmitting unit 230 may transmit an uplink signal according to a component carrier, the feedback timing of the PUCCH signal, and the scheduling timing of the PUSCH signal designated dynamically by a DCI signaling in the overlapping downlink subframes.

The various specific implementations of the respective units above of the wireless communication system according to the embodiments of the present disclosure have been described in detail previously, and therefore the explanations thereof will not be repeated herein.

Apparently, respective operating processes of the method for performing wireless communication in a wireless communication system according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the technical solution in the present disclosure can also be implemented by connecting a computer to a corresponding web site on the Internet, downloading and installing the computer executable program according to the invention into the computer, and then executing the program.

Figure 8:
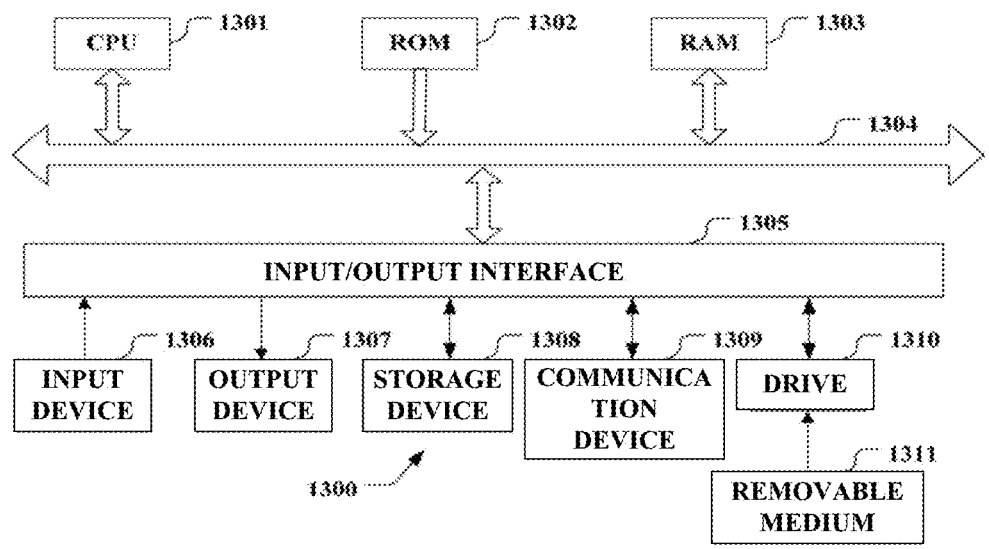
FIG. 8 is a block diagram illustrating an exemplary structure of a general-purpose personal computer on which the method for performing wireless communication in a wireless communication system according to the embodiments of the present disclosure can be implemented.

FIG. 8 is a block diagram illustrating an exemplary structure of a general-purpose personal computer on which the method for performing wireless communication in a wireless communication system according to the embodiments of the present disclosure can be implemented.

As shown in FIG. 8, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 can also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

In a case that the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 8 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

The invention claimed is:

1. A method for performing wireless communication in a wireless communication system, the wireless communication system comprising a first base station and a user equipment (UE), the method comprising:
communicating from the UE with the first base station via a first component carrier and a second component carrier; and
communicating from the UE with a second base station via a third component carrier, wherein a coverage area of at least two of the first component carrier, the second component carrier, or the third component carrier, are different;
assigning, by the first base station priority information to each of the first and second component carrier, wherein the priority information is based upon coverage area information of the first and second component carrier;
transmitting a message to the UE, the message indicating a setting or a changing of the priority information; and
selecting, by the UE, a candidate component carrier for transmission of an uplink signal by the UE, from the first component carrier or the second component carrier based on the received assigned priority information and based on which component carrier has a lower expected power loss for the transmission of the uplink signal by the UE on the selected candidate component carrier.

2. The method according to claim 1, wherein,
a coverage area of the first component carrier is larger than a coverage area of the second component carrier; and
the coverage area of the second component carrier is larger than a coverage area of the third component carrier.

3. The method according to claim 1, wherein,
a frequency of at least two of the first component carrier, the second component carrier, or the third component carrier are different.

4. The method according to claim 3, wherein,
a frequency of the first component carrier is lower than a frequency of the second component carrier; and
the frequency of the second component carrier is lower than a frequency of the third component carrier.

5. The method according to claim 1, Wherein,
the communicating from the UE with the first base station includes performing carrier aggregation with the first component carrier and the second component carrier.

6. The method according to claim 1, further comprising,
communicating from the UE with the second base station via a fourth component carrier,
wherein, at least two of a coverage area of the first component carrier, a coverage area of the second component carrier, a coverage area of the third component carrier, and a coverage area of the fourth component carrier are different.

7. The method according to claim 6, wherein
the communicating from the UE with a second base station via the third component carrier includes communicating with the second base station via the third component carrier and a fourth component carrier in carrier aggregation.

8. The method according to claim 1, wherein,
the communicating from the UE with the first base station via the first component carrier and the second component carrier includes the UE communicating with the first base station and the second base station at a same time via the first component carrier and the third component carriers in dual connectivity.

9. The method according to claim 8, wherein,
in the dual connectivity, the UE further performs communicating with the first base station via the second component carrier.

10. The method according to claim 6, further comprising:
performing dual connectivity, wherein the UE further performs communicating with the second base station via the third component carrier and the fourth component carrier.

11. The method according to claim 1, wherein,
the first base station is a macro base station, and the second base station is a micro base station.

* * * * *